United States Patent
Shirokura et al.

(10) Patent No.: US 7,509,018 B2
(45) Date of Patent: Mar. 24, 2009

(54) PLASTIC OPTICAL FIBER AND PRODUCTION METHOD THEREOF

(75) Inventors: Yukio Shirokura, Shizuoka (JP); Kousuke Yamaki, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/639,309

(22) Filed: Dec. 15, 2006

(65) Prior Publication Data
US 2007/0217753 A1 Sep. 20, 2007

(30) Foreign Application Priority Data
Dec. 15, 2005 (JP) .............................. 2005-361284

(51) Int. Cl.
*G02B 6/00* (2006.01)
*G02B 6/02* (2006.01)

(52) U.S. Cl. .................. 385/145; 385/123; 385/141

(58) Field of Classification Search ......... 385/123–128, 385/141, 144, 145; 264/1.24
See application file for complete search history.

(56) References Cited
U.S. PATENT DOCUMENTS
2002/0009276 A1    1/2002    Sugiyama et al.

2005/0226580 A1 *  10/2005   Samson et al. .............. 385/127

FOREIGN PATENT DOCUMENTS

| JP | 08-304636 A   |   | 11/1996 |
|----|---------------|---|---------|
| JP | 08-338914     | * | 12/1996 |
| JP | 09-218327 A   |   | 8/1997  |
| JP | 09-236735 A   |   | 9/1997  |
| JP | 11-337781 A   |   | 12/1999 |
| JP | 2000-098144 A |   | 4/2000  |

* cited by examiner

*Primary Examiner*—Charlie Peng
(74) *Attorney, Agent, or Firm*—Sughrue Mion, PLLC

(57) ABSTRACT

A cylindrical outer clad section is formed by melt-extrusion molding of polyvinylidene fluoride (PVDF) having a molecular structure in which the number of defect bonds of successive $CF_2$ units and successive $CH_2$ units constitutes not less than 4% with respect to a total number of bonds of $CF_2$ units and $CH_2$ units. Next, an inner clad section forming material is poured into a hollow portion of the outer clad section and polymerized to form a cylindrical inner clad section. A core section forming material is filled in a hollow portion of the inner clad section and polymerized to form a core section. Thus, a preform is fabricated. The preform is heat-drawn to obtain a POF. The POF has an outer clad in which small spherocrystals are formed. Average roughness Ra of an inner wall of the outer clad is less than 0.10 μm.

5 Claims, 7 Drawing Sheets

US 7,509,018 B2

PLASTIC OPTICAL FIBER AND PRODUCTION METHOD THEREOF

BACKGROUND OF THE INVENTION

1. Field of the Invention

The present invention relates to a plastic optical fiber and a production method thereof.

2. Description of the Related Art

Plastic optical fibers, hereinafter referred to as POFs have advantages such as lightweight, excellent workability, and low production cost compared to quartz based POFs due to being formed of plastics. The POFs also have other advantages such as easily increasable diameter, and high bending tolerance due to high flexibility. However, on the other hand, these advantages increase the optical transmission losses in the POFs, making the POFs not suitable for optical transmittance for long distance. The POFs attract attention as light transmission media for a short distance such as for domestic use, vehicle-mounted use, or the like in which the transmission losses are not concerned.

The POF is constituted of a core and a clad. The clad is formed on the outer periphery of the core and has a lower refractive index than the core. Light propagates through the core, and the clad prevents light leakage therefrom. Thus, the POF is constituted of sections having different properties. The POF functions as the light transmission medium by totally reflecting the light at an interface between the core and the clad having different refractive indices.

The POFs are broadly divided into graded index (GI) type, step index (SI) type, and multistep index (MSI) type according to refractive index profiles. Recently, GI POFs attract the most attention. The GI POFs are light transmission media which achieve high-speed transmission with low transmission losses by preventing light scattering and irregular reflections.

The POFs including the GI POFs are produced by heat-drawing preforms with the use of heating devices. The preform is constituted of a core section which is a precursor of the core, and a clad section which is a precursor of the clad. To form the preform, a cylindrical clad section is prepared, and then a polymerizable compound which is formed into a core section is filled into a hollow portion of the clad section. The cylindrical clad section containing the polymerizable compound is rotated and polymerized to fabricate the preform having the core section inside the clad section. The POF is obtained by heat-drawing the preform.

Since the POFs are constituted of plastic, they exhibit excellent bending tolerance. However, on the other hand, bending causes transmission losses (hereinafter referred to as bending losses). The bending losses significantly lower the function of the POFs as the optical transmission media. The POFs with the reduced bending losses are suggested in the following: a GI POF having at least two layers each of which containing fluorine-containing polymer as a matrix, and the outer layer contains the fluorine-containing polymer whose refractive index is lower than the outermost portion of the inner layer by 0.001 or more (for instance, see Japanese Patent Laid-Open Publication No. 08-304636); a plastic optical fiber cable which has cavities between an outer periphery of a POF and a coating layer (for instance, see Japanese Patent Laid-Open Publication No. 09-218327); a plastic optical fiber cable having a coating layer formed of resin foam around an outer periphery of a POF (for instance, see Japanese Patent Laid-Open Publication No. 09-236735); a POF provided with two coating layers having different elastic moduli around its outer periphery (for instance, see Japanese Patent Laid-Open Publication No. 11-337781); and a POF having an inner layer formed of non-crystalline fluorine-containing polymer without C—H bonds and an outer layer formed of fluorine-containing polymer (for instance, see U.S. Patent Application Publication No. 2002/0009276, corresponding to Japanese Patent Laid-Open Publication No. 2002-071972). Further, a method for forming a POF with a reduced bending loss is suggested. In this method, a non-crystalline thermoplastic resin composition is coated around an outer periphery of a preform having a certain refractive index profile by extrusion-coating. Thereafter, the coated preform is heat-drawn into a POF (for instance, see Japanese Patent Laid-Open Publication No. 2000-098144.)

In the case the crystalline fluorine-containing polymer is used for the outer layer, spherocrystals formed in the inner wall of the outer layer makes the surface of the inner wall rough, causing the light scattering at the interface between the inner layer and the outer layer. As a result, the bending loss cannot be reduced. On the other hand, in the case non-crystalline fluorine-containing polymer is used for forming the outer layer, it is inferior in solvent resistance to a monomer. As a result, it becomes difficult to form a core which will be the optical transmission path with a monomer inside the outer layer. In the case the cavities are formed between the POF and the protective layer, it is difficult to control shapes, sizes and conditions of the cavities. In the case the resin foam layer is formed, it is difficult to control foam conditions in the resin foam. Therefore, diameter fluctuations of the POF and exacerbation of non-circularity may occur.

The coating layers having different elastic moduli are effective for reducing structural imperfection caused by bending. However, it is difficult to reduce the bending losses namely the light leakage and/or the light scattering caused at the interface between the clad and the core. In the case the diameter of the core which is the optical transmission path is extremely small, it becomes difficult to connect the POFs. As a result, the workability is reduced. Therefore, a production method of the POF by which the bending loss of the POF is reduced without lowering the productivity is needed.

SUMMARY OF THE INVENTION

In view of the foregoing, an object of the present invention is to provide a POF in which a bending loss caused by bending stress and light scattering are reduced. Another object of the present invention is to provide a production method of the above POF without reduction in productivity.

In order to achieve the above and other objects, a plastic optical fiber of the present invention includes a cylindrical outer clad whose inner wall has an average roughness Ra ($\mu$m) of less than 0.10 $\mu$m, a cylindrical inner clad formed in a hollow portion of the outer clad, and a core which is an optical transmission path formed in a hollow portion of the inner clad.

The outer clad is formed of polyvinylidene fluoride having a molecular structure in which the number of defect bonds of successive $CF_2$ units and successive $CH_2$ units constitutes not less than 4% with respect to a total number of bonds of $CF_2$ units and $CH_2$ units.

A refractive index of the core gradually decreases from a center toward outside, and is equal to or higher than that of the inner clad.

A production method of a plastic optical fiber includes the following steps: forming a cylindrical outer clad section by melt-extrution molding of the polyvinylidene fluoride having the molecular structure in which the number of the defect bonds of the successive $CF_2$ units and successive $CH_2$ units constitutes not less than 4% with respect to the total number of the bonds of $CF_2$ units and $CH_2$ units; putting a first polymerizable compound in a hollow portion of the outer clad section; polymerizing the first polymerizable compound to form a cylindrical inner clad section; filling a second polymerizable compound in a hollow portion of the inner clad section; polymerizing the second polymerizable compound to form a core section to fabricate a preform; and heat-drawing the preform to form the optical plastic fiber.

An average roughness Ra (μm) of an inner wall of the outer clad section after the heat-drawing is less than 0.10 μm.

The preform is heat-drawn in a range of 180° C. to 300° C.

According to the present invention, it becomes possible to provide the POF which transmits the light with low bending loss, while preventing light scattering and light leakage to the outside caused by bending. Further, the method for continuously producing the POF with the reduced bending loss is achieved.

BRIEF DESCRIPTION OF THE DRAWINGS

The above objects and advantages of the present invention will become apparent to a person skilled in the art from the following detailed description of the preferred embodiments of the invention when read in conjunction with the accompanying drawings, in which.

DETAILED DESCRIPTION OF THE PREFERRED EMBODIMENT(S)

The preferable embodiments of the present invention are hereinafter described in detail, but these embodiments do not limit the scope of the present invention.

Figure 1:
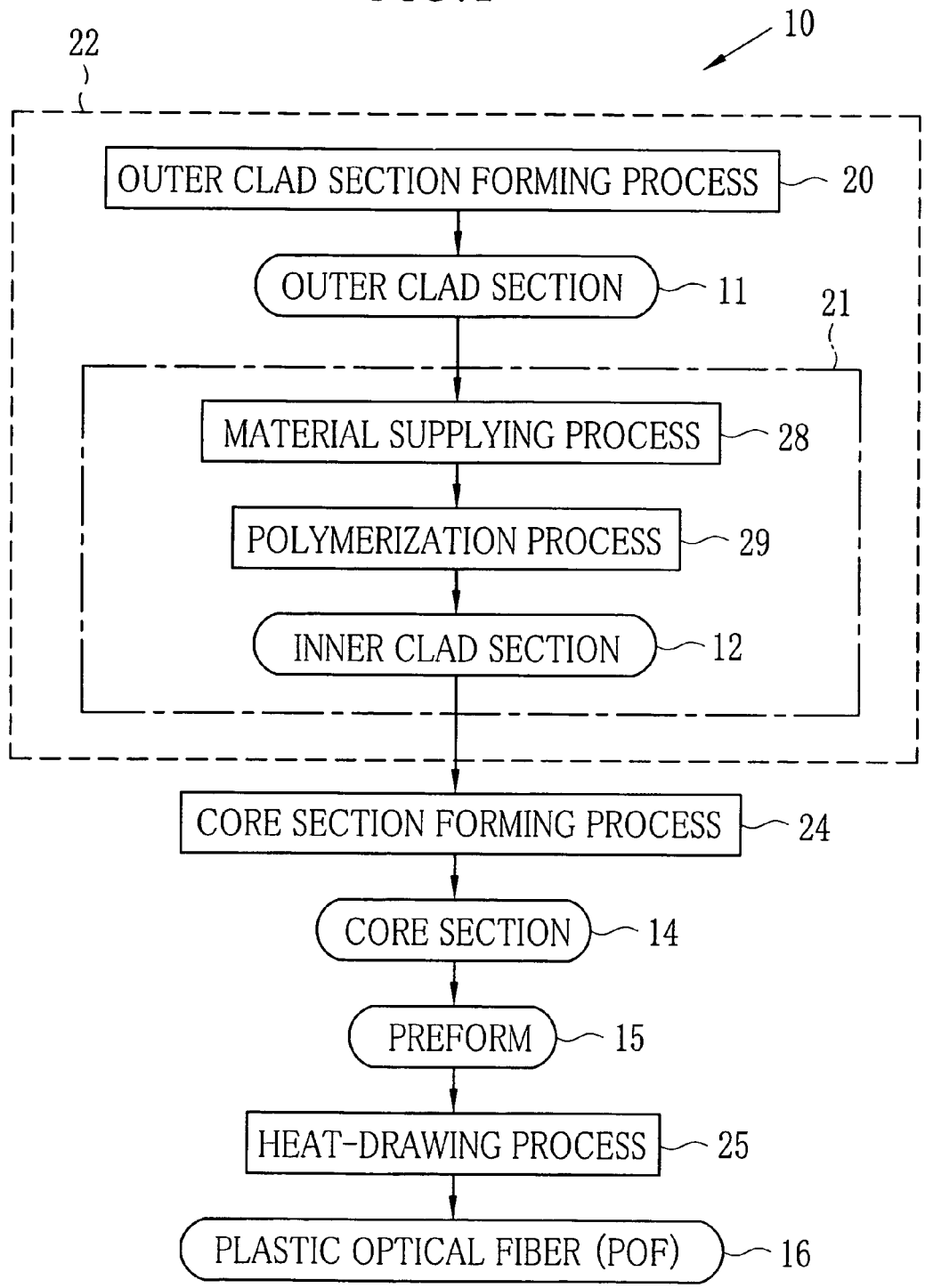
FIG. 1 is a schematic view illustrating a POF production process of the present invention.

In FIG. 1, a POF production process 10 of the present invention includes a clad section forming process 22, a core section forming process 24, and a heat-drawing process 25. The clad section forming process 22 includes an outer clad section forming process 20 and an inner clad section forming process 21.

First, a cylindrical outer clad section 11 is formed in the outer clad section forming process 20. The outer clad section 11 is an outer shell of a preform 15 which is a polymer obtained by polymerizing the polymerizable compound. For instance, the outer clad section 11 can be formed as an outer clad section pipe by melt-extrusion of a polymer (hereinafter referred to as a melt-extrusion molding). It is also possible to pour the polymerizable compound (hereinafter referred to as an outer clad section forming material) into a ready-made pipe and then the pipe is rotated to polymerize the outer clad section forming material to form the cylindrical outer clad section 11 having a hollow center portion. Other methods are also applicable in the present invention. In this embodiment, the melt-extrusion molding is used.

Polyvinylidene fluoride (PVDF) is preferable for the outer clad section forming material. The PVDF is represented by a general formula of —$(CF_2$—$CH_2)$n—, and normally has the molecular structure of alternate $CF_2$ units and $CH_2$ units. A bond of —$CF_2$— and —$CH_2$— is referred to as a regular bond. However, the PVDF of the present invention preferably include defect bonds which are not the regular bonds in its molecular chains. The defect bonds are the bond of —$CF_2$— and —$CF_2$—, and the bond of —$CH_2$— and —$CH_2$—. It is preferable to use the PVDF having a molecular structure in which the number of defect bonds constitutes not less than 4%. The percentage of the defect bonds is expressed in a mathematical expression (y/x)×100, when x represents the total number of the bonds of $CF_2$ units and $CH_2$ units, and y represents the number of the defect bonds. The percentages of the defect bonds differ according to polymerization methods, namely, a suspension polymerization method and an emulsion polymerization method. In the suspension polymerization method, polymer beads are obtained by polymerizing monomers diffused in water. In the emulsion polymerization method, polymer is obtained by polymerizing monomers in which emulsifiers (surfactants) are added. The percentage of the defect bonds in the PVDF obtained by the emulsion polymerization method is larger than that obtained by the suspension polymerization method, and is normally not less than 4%. Therefore, in the present invention, it is preferable to use the PVDF obtained by the emulsion polymerization method. By using this PVDF for forming the outer clad section 11 of a POF 16, the POF 16 exhibits excellent solvent resistance, and the average roughness of the inner wall of the outer clad section 11 becomes small. Thereby, the bending loss and light leakage are reduced. As a result, the POF having the low transmission loss is obtained.

In the outer clad section forming process 20, the polymerization temperature of the outer clad section forming material is not particularly limited. A preferable polymerization temperature is in a range of 180° C. to 240° C. Within this temperature range, the outer clad section forming material obtains appropriate viscosity for molding. At the time of polymerization of the polymerizable compound which generates PVDF by the polymerization, the percentage of the defect bonds increases as the polymerization temperature increases. For this reason, it is preferable to increase the polymerization temperature as much as possible within the above range. The size of the spherocrystals formed in the outer clad section 11 becomes very low as the percentage of the defect bonds increases. As a result, the average roughness of the inner wall of the outer clad section 11 becomes very low. By using PVDF having the molecular structure in which the number of the defect bonds constitutes not less than 4%, the outer clad 11 having smaller spherocrystals is formed. Thus, the roughness of the inner wall of the outer clad 11 is significantly reduced. In the present invention, average roughness Ra' represents the average roughness of the inner wall of the outer clad section 11. The average roughness Ra represents the average roughness of the inner wall of an outer clad 41. It is preferable to reduce the average roughness Ra to zero, but it is difficult. Accordingly, it is preferable to make the average roughness Ra as small as possible in the range of less than 0.10 μm. Note that when the percentage of the defect bonds is too high, properties such as mechanical strength of the outer clad section 11 and the outer clad 41 may be deteriorated. Therefore, the percentage of the defect bonds is determined while satisfying the quality and the above roughness. In the present invention, the average roughness is an arithmetic mean deviation of the profile which is an arithmetic mean of the absolute values of distances from a mean line to the profile of a sample surface roughness curve of an evaluation length (L) in a mean line direction. Measuring methods of the average roughness Ra' and Ra are not particularly limited. Commercially available surface roughness meters can be used.

In a material supplying process 28 of the inner clad section forming process 21, polymerizable compound for forming an inner clad section 12 (hereinafter referred to as an inner clad section forming material) is poured into a hollow portion of the cylindrical outer clad section 11. Next, in a polymerization process 29, the poured inner clad section forming material is thermally polymerized to form the cylindrical inner clad section 12.

In the polymerization process 29, a polymerization temperature is preferably in a range of 50° C. to 100° C., more preferably, in a range of 60° C. to 100° C., and especially preferably, in a range of 70° C. to 100° C. Thereby, the polymerization degree of the inner clad section forming material is efficiently increased. However, when the polymerization temperature exceeds 100° C., the inner clad section forming material is damaged by heat. As a result, the produced polymer may be deteriorated, or foam may be generated therein. On the other hand, when the polymerization temperature is less than 50° C., it is too low for polymerizing the inner clad forming material. The polymerization time is preferably in a range of 4 to 30 hours to achieve sufficient polymerization without reducing productivity. It is more preferable that the polymerization time is in a range of 6 to 25 hours. It is especially preferable that the polymerization time is in a range of 8 to 20 hours. Polymerization temperature and polymerization time in the polymerization process 29 can be properly selected within the above ranges, in accordance with the sorts and amounts of the outer clad section forming material and the inner clad section forming material.

In the polymerization process 29, at an initial state of polymerization of the inner clad section forming material, a part of the heated outer clad section 11 (especially in the proximity of the inner wall) and the inner clad section forming material are mixed to form a mixed section. This mixed section inhibits the light scattering and light leakage to outside. For this reason, the mixed section is preferable. Since the mixed section is formed by mixing the outer clad section 11 and the inner clad section 12, the mixed section has the lower degree of crystallinity than the outer clad section 12. Disappearance of crystallization property by blending the crystalline polymer and the non-crystalline polymer disclosed in pages 115 to 120 of "Relationship between UV transmission and solubility of PVDF/PMMA blend" (Nippon Kagaku Kaishi or Journal of the Chemical Society of Japan No. 2, 2000) helps to understand the lowered degree of crystallinity in the mixed section.

In the material supplying process 28 of the inner clad section forming process 21, the inner clad section forming material is poured into the hollow portion of the outer clad section 11. The outer clad section 11 in which the inner clad section forming material is poured into is accommodated in a pipe. It is preferable to rotate the pipe prior to the start of the polymerization. Thereby, the inner wall of the outer clad section 11 is swelled and permeated into the inner clad section forming material, which improves the smoothness of the inner wall of the outer clad section 11. As a result, adhesion property between the outer clad section 11 and the inner clad section 12 is improved to further prevent the light leakage. The rotation axis of the pipe is a center of a cross-section circle. The pipe is placed in a horizontal direction and rotated about the rotation axis in either the clockwise or counter clockwise direction.

In the core section forming material 24, a material for forming a core section 14 (a core section forming material) is filled into the inner clad section 12. Thereafter, the core section forming material is polymerized to form the core section 14, and thus the preform 15 is fabricated. Note that the polymerization time and polymerization temperature of the inner clad section forming process 21 can also be applied to the core section forming process 24 so that the description is omitted.

Figure 2:
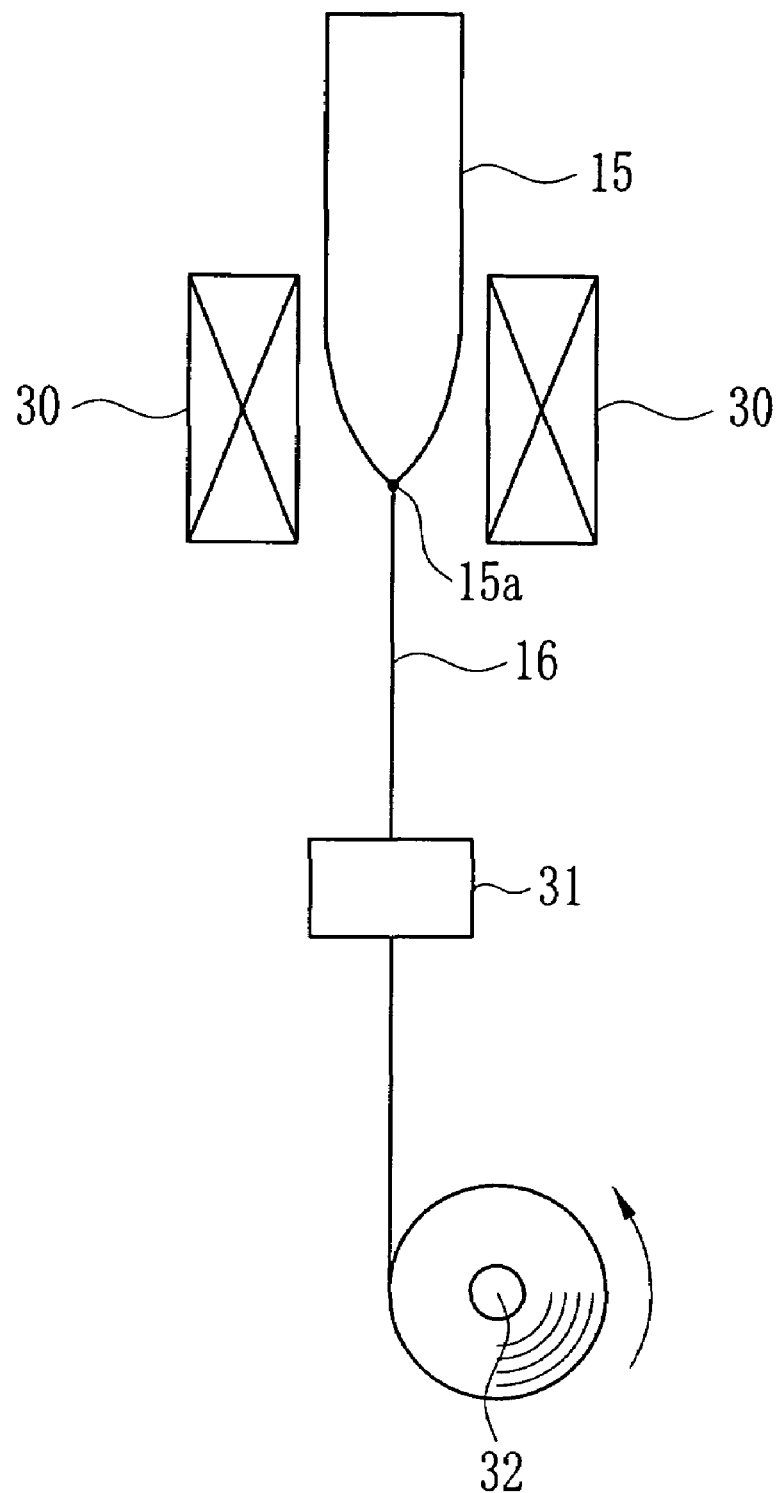
FIG. 2 is a schematic view of an example of a furnace used for heat-drawing a preform.

The POF 16 is produced by subjecting the preform 15 to the heat-drawing process 25. As shown in FIG. 2, in the heat-drawing process 25, the preform 15 is heated by a furnace 30 so that the preform 15 is partially softened. A tip 15a of the softened portion is drawn (stretched), and thus the POF 16 is produced. The POF 16 is wound by a winding roll 32 of a winding device (not shown) in a roll form after passing through a diameter monitor 31. An outer diameter of the POF 16 is constantly monitored by the diameter monitor 31. In response to the monitored results, the position of the preform 15 in the furnace 30, the temperature in the furnace 30, the winding speed of the winding device, and the like are properly adjusted to maintain the uniform diameter of the POF 16.

Inside the furnace 30, it is preferable to install an inert gas supplying device (not shown). The inert gas is supplied inside the furnace 30 during the heat-drawing of the preform 15 to prevent the deterioration thereof caused by heating. The inert gas is not particularly limited. Nitrogen gas, helium gas, neon gas, argon gas, or the like can be used. In terms of cost, nitrogen gas is preferable. In terms of thermal conductivity efficiency, helium gas is preferable. It is also possible to use a mixture gas in which plural sorts of gases are mixed, for instance, helium gas and argon gas.

The temperature inside the furnace 30 during the heat-drawing process 25 is in a range of 180° C. to 300° C., and more preferably adjusted in a range of 200° C. to 290° C. It is especially preferable that the temperature inside the furnace 30 is in a range of 220° C. to 280° C. At this high temperature, the polymerization degree of the clad section 23 and the core section 14 constituting the preform 15 are further increased. Moreover, the crystallization of the outer clad section forming material is inhibited so that the outer clad section with smaller spherocrystals is obtained. As a result, light scattering and light leakage to the outside caused by bending are prevented in the preform 15. Consequently, the POF 16 having the above properties is produced by heat-drawing the preform 15. Note that the percentage of defect bonds in the PVDF which constitutes the outer clad section 11 does not change before and after the heat-drawing. If the heat-drawing temperature exceeds 300° C. in the case PVDF is used as the outer clad section forming material, PVDF is decomposed into hydrogen fluoride gas by heat. As a result, foam is generated in the outer clad section 11. The foam inside the preform 16 drastically lowers the optical properties of the preform 15 and the POF 16.

The polymerization degree of the mixed section formed between the outer clad section 11 and the inner clad section 12 is improved by extending the heat-drawing time of the preform 15. Thereby, the POF 16 having a mixed layer with sufficient thickness is obtained. The mixed section in the preform 15 will be the mixed layer in the POF 16. Therefore, in view of increasing the polymerization degree, it is preferable to extend the heat-drawing time as much as possible. However, the extended heat-drawing time may cause problems, e.g. reduction of the productivity resulting from longer production time and deterioration of the sections in the POF 16 due to longer exposure to heat. To obtain the mixed layer with the sufficient thickness and to keep the excellent productivity at the same time, the heat-drawing time is preferably in a range of 1 minute to 80 minutes. It is more preferable that the heat-drawing time is in a range of 2 minutes to 60 minutes. It is especially preferable that the heat-drawing time is in a range of 3 minutes to 40 minutes. Further, it is preferable to appropriately adjust the heat-drawing rate in a range of 3 m/min to 15 m/min in consideration of the above heat-drawing time and the desired diameter of the POF 16 to be produced.

The heat-drawing temperature and the heat-drawing time are properly determined within the above range in accordance with the material of the preform 15. Note that in the graded index plastic optical fiber (GI POF), the refractive index gradually changes from the center toward the outer periphery thereof in the diameter direction. The heating and heat-drawing must be performed uniformly to the preform 15 in order not to damage the above changes in the refractive index. For this reason, the furnace 30 of a cylindrical form is preferable to uniformly heat the preform 15 concentrically in the diameter direction.

Drawing tension of the preform 15 is preferably not less than 0.098N to allow the softened polymer to be oriented as disclosed in Japanese Patent Laid-Open Publication No. 7-234322. Further, the drawing tension is preferably not more than 0.98N to eliminate distortion of the molecular orientation after the heat-drawing as disclosed in Japanese Patent Laid-Open Publication No. 7-234324. Since the optimum drawing tension changes depending on the diameter or the sorts of the materials of the POF 16 to be produced, it is necessary to adjust the drawing tension accordingly. It is also possible to pre-heat the preform 15 prior to the heat-drawing as described in Japanese Patent Laid-Open Publication No. 8-106015.

Next, the preform 15 and the POF 16 according to the present invention are described.

Figure 3A:
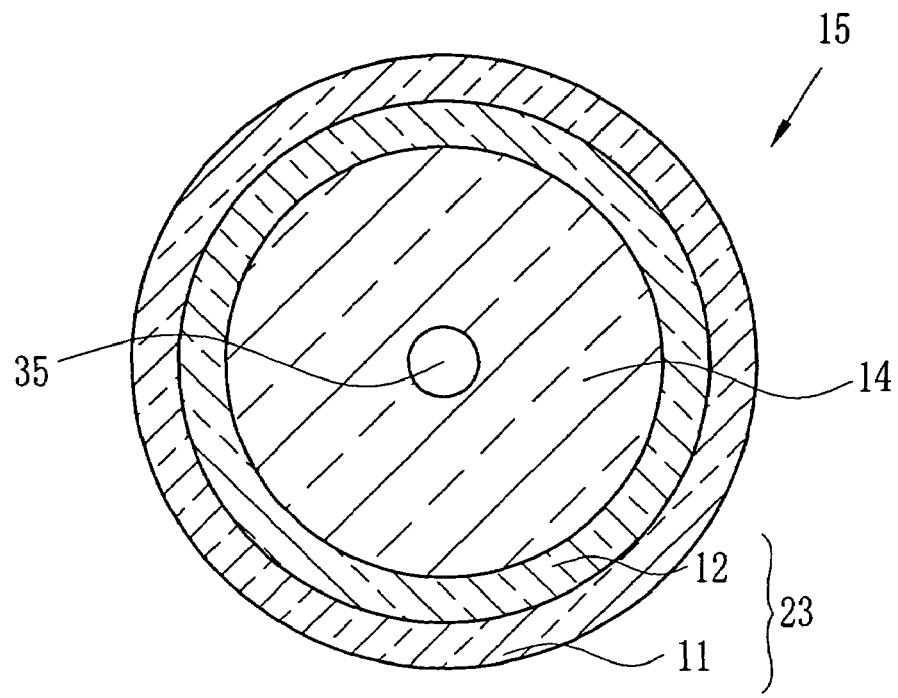
FIG. 3A is a cross-section of an example of a preform of the present invention.

In FIG. 3A, the preform 15 has the clad section 23 to confine light, and the core section 14 which is an optical transmission path. The clad section 23 and the core section 14 are formed concentrically. The clad section 23 is constituted of the outer clad section 11, and the inner clad section 12 formed on the inner wall of the outer clad section 11. The core section 14 has a hollow section 35 throughout its center portion.

The outer clad section 11 and the inner clad section 12 are cylindrical sections. Outer and inner diameters thereof and the thicknesses thereof are constant in the lengthwise direction. In the present invention, the outer clad section 11 is formed by melt-extrusion of PVDF which is crystalline fluorine-containing polymer having the molecular structure in which the number of the defect bonds constitutes not less than 4% with respect to the total number of the bonds of $CF_2$ units and $CH_2$ units. The inner clad section 12 is constituted of an amorphous polymer. In this embodiment, MMA which is the inner clad section forming material is poured into the hollow portion of the cylindrical outer clad section 11, and thermally polymerized to form the inner clad section 11 whose main component is polymethyl methacrylate (hereinafter referred to as PMMA). The outer clad section 11 and the inner clad section 12 are not limited to polymers constituted of monomers of a single type. The outer and inner clad sections 11 and 12 can be constituted of polymers formed by polymerization of oligomers such as dimers and trimers, or of plural types of polymerizable compounds.

Figure 3B:
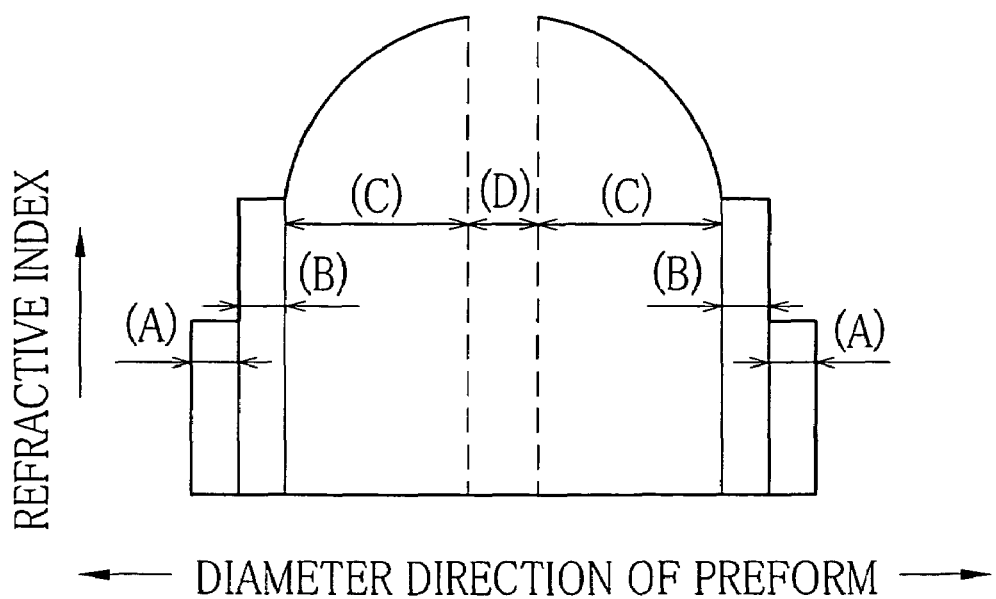
FIG. 3B is a refractive index profile of an example of the preform in a diameter direction.

In the present invention, the core section forming material is a mixture of MMA and DPS (diphenylsulfide) which is a refractive index modifier (dopant). After the core section forming material is poured into the hollow portion of the inner clad section 12, the core section forming material is subjected to interfacial gel polymerization. Thereby, the core section whose main component is PMMA and having refractive index profile shown in FIG. 3B is formed, and thus the preform 15 constituted of the clad section 23 and the core section 14 is fabricated. The clad section includes the outer clad section 11 and the inner clad section 12. The outer diameter of the outer clad section 11 is not particularly limited. The outer diameter thereof is preferably in a range of 20 mm and 32 mm to sufficiently prevent the light leakage and light scattering. The thickness of the inner clad section 12 is preferably in a range of 3 mm to 10 mm to obtain the preform 15 which is excellent in optical transmission properties. The thickness of the core section 14 is preferably in a range of 2 mm and 10 mm.

In FIG. 3A, boundaries between the sections are illustrated for the sake of convenience. However, the boundaries in the preform 15 may not be clearly provided or may be disappeared as the interfacial gel polymerization reaction proceeds. Further, in FIG. 3A, the preform 15 has the hollow section 35 throughout its center portion. However, a ratio between the diameter of the cross-section of the hollow section 35 and the outer diameter of the preform 15 may be changed depending on production conditions. The hollow section 35 may even disappear during the production process.

In FIG. 3B, the horizontal axis shows a diameter direction of the preform 15, and the vertical axis shows the refractive index value. The refractive index value increases toward the upper direction of the vertical axis. The refractive index of the outer clad section 11 in FIG. 3A is indicated in the range (A) in the diameter direction of FIG. 3B. The refractive index of the inner clad section 12 in FIG. 3A is indicated in the range (B). The refractive index of the core section 14 in FIG. 3A is indicated in the range (C). The refractive index of the hollow section 35 in FIG. 3A is indicated in the range (D) so that there is no refractive index value.

As shown in FIG. 3B, the refractive index of the preform 15 gradually decreases from the proximity of the hollow section 35 toward the outer periphery in the diameter direction. The POF 16 produced by heat-drawing the preform 15, that is, the POF 16 having this type of refractive index profile is generally called the GI POF 16. The GI POF 16 prevents the light leakage and light scattering so that the POF 16 has extremely low transmission loss and a wide range of transmission band. To achieve the above refractive index profile, there are a method in which materials having different refractive indices are used, and a method in which a refractive index modifier (dopant) is used. In the present invention, either one or any combination of the above methods can be used. In this embodiment, the refractive index of the inner clad section forming material is higher than that of the outer clad section forming material. The refractive index of the core section forming material is higher than that of the inner clad section forming material. The dopant will be described in detail later.

Figure 4A:
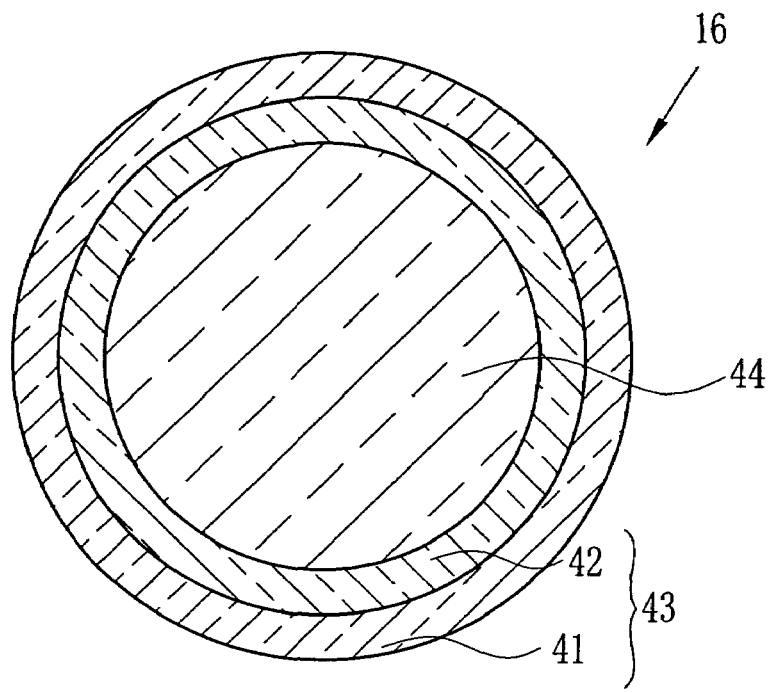
FIG. 4A is a cross-section of an example of a POF of the present invention.

The POF 16 produced by heat-drawing the preform 15 is described. In FIG. 4A, the POF 16 has a clad 43 and a core 44. The clad 43 is formed by heat-drawing the clad section 23. The core 44 is formed by heat-drawing the core section 14. The clad 43 is constituted of an outer clad 41, and an inner clad 42. The hollow section 35 in the preform 15 has been filled and disappeared while the diameter of the preform 15 is reduced by heat-drawing. Since the preform 15 is heat-drawn in the lengthwise direction to be the POF 16, each section constituting the POF 16 has smaller diameter than its precursor constituting the preform 15.

Figure 4B:
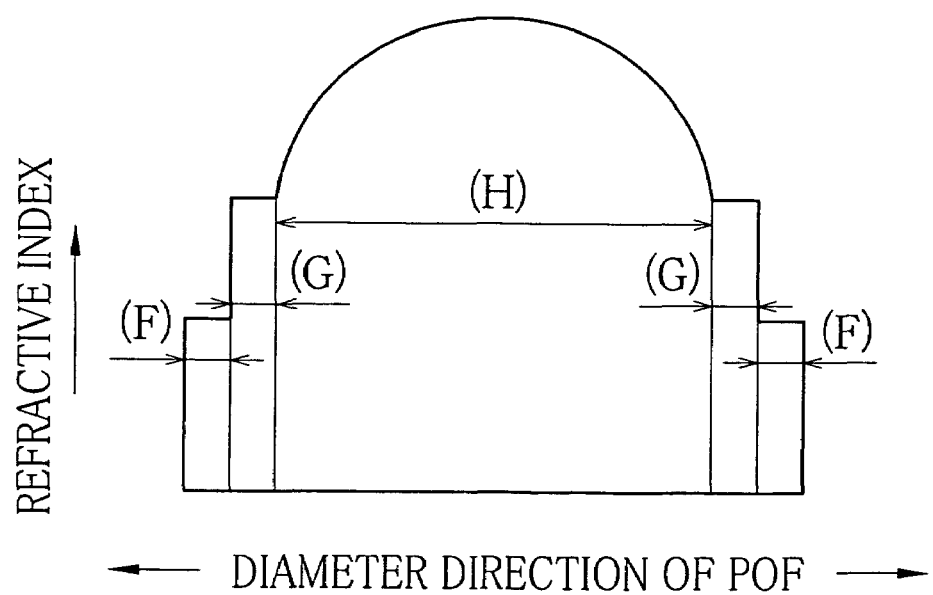
FIG. 4B is a refractive index profile of an example the POF in a diameter direction.

A vertical axis and a horizontal axis in FIG. 4B are equivalent to those in FIG. 3B so that the descriptions thereof are omitted. The refractive index of the outer clad 41 in FIG. 4A is indicated in the range (F) in FIG. 4B. The refractive index of the inner clad 42 in FIG. 4A is indicated in the range (G). The refractive index of the core 44 in FIG. 4A is indicated in the range (H). Each section of the POF 16 has smaller diameter and a higher polymerization degree compared to that of the preform 15. However, the optical properties of each section in POF 16 are approximately equivalent to corresponding section in the preform 15. For that reason, as shown in FIG. 4B, the refractive index profile in each section of the POF 16 in the diameter direction is approximately equivalent to that in the preform 15 shown in FIG. 3B. The outer clad 41 has the lowest refractive index. The refractive index increases in the inner clad 42, and the core 44 in this order.

Accordingly, the refractive index profile coefficient of the preform 15 is approximately equivalent to that of the POF 16. The refractive index profile coefficients of the preform 15 and of the POF 16 are represented by "g" in the following equation (I). "R" is an outer diameter of the preform 15 or of the POF 16, "r" is a distance between the center of the preform 15 or of the POF 16 in the diameter direction and a measurement position, "n1" is a maximum refractive index value in the preform 15 or in the POF 16 in the diameter direction, "n2" is a minimum refractive index value in the preform 15 or in the POF 16 in the diameter direction, and Δ is a value obtained by (n1−n2)/n1. In the present invention, the refractive index coefficients of the preform 15 and of the POF 16 are preferably in a range of 0.5 to 4.0, more preferably in a range of 1.5 to 3.0, and ideally 2.0.

$$n(r) = n1\{1 - 2(r/R)^g \times \Delta\}^{1/2} = n1(1 - 2\Delta)^{1/2} \quad (I)$$

In the present invention, the average roughness Ra of the inner wall of the outer clad 41 is less than 0.10 μm. In this embodiment, the PVDF having the molecular structure in which the number of the defect bonds constitutes not less than 4% with respect to the total number of bonds of $CF_2$ units and $CH_2$ units is used for the outer clad section forming material, and this PVDF is melted and subjected to extrusion molding to form the outer clad section 11. This outer clad section 11 hinders the growth of the spherocrystals during the heat-drawing process 25 of the preform 15, so that the outer clad 41 having smaller spherocrystals is formed. As a result, the average roughness Ra of the inner wall of the outer clad section 41 becomes extremely small (less than 0.10 μm). The POF 16 having this outer clad 41 effectively prevents the light scattering and light leakage to the outside so that the bending loss becomes extremely small. It becomes possible to reduce the bending loss X of the POF 16 within a range of the following mathematical expression (II). D (μm) represents the diameter of the inner clad 42 (in the diameter direction). During the production of the POF 16, the draw ratio is adjusted to satisfy 300<D<710.

$$-0.015 + 0.1 \times D^{1.5} < X < 0.3 + 0.1 \times D^{1.5} \quad (II)$$

A plastic optical fiber cord (hereinafter referred to as a cord) is obtained by providing a protective coating layer of resin around the outer periphery of the POF 16. A method of providing the protective coating layer is not particularly limited. For instance, it is possible to use an extrusion method using thermoplastic resin. In this case, the same resin as or different sorts of resin from that used for the POF 16 can be applied. Thereby, the cord having desirable properties such as flame-resistance and weather-resistance is obtained. The protective coating layer forming process can be performed after the heat-drawing of the preform 15 in the POF production process 10 shown in FIG. 1, or in a separate process from the POF production process 10.

It is also possible to form a plastic optical fiber cable (hereinafter referred to as a cable) by binding the several cords, and coating the outer periphery thereof by resin. In the present invention, the optical fiber provided with the protective coating layer around the outer periphery of the POF 16 is referred to as a plastic optical fiber core wire, or the cord. The cord provided with additional coatings as necessary is referred to as a single fiber cable. When plural cords are bound with tensile strength wire and the coating is applied to the outer periphery thereof, it is referred to as a multi-fiber cable. The single fiber cable and the multi-fiber cable are collectively called as the cables.

The material of the clad section 23 including the outer clad section 11 and the inner clad section 12, and the material of the core section 14 of the preform 15 are not limited as long as having the optical transmission function. The preferable material is organic material with high optical transparency. To prevent the light scattering, the core material is preferably amorphous polymer. It is preferable that the clad material and the core material are excellently adhered to each other. Moreover, it is preferable that the clad material and the core material are excellent in mechanical properties such as toughness. It is also preferable that the clad material and the core material are excellent in heat resistance and moisture resistance.

In the present invention, crystalline fluoropolymer is used for the outer clad section forming material. The crystalline fluoropolymer is a fluorine-containing resin in which a crystalline structure area exists in a non-crystalline structure area. The crystalline structure area is an area in which long molecular chains are orderly aligned, and the non-crystalline structure area is an area in which the long molecular chains are randomly aligned. With the use of the crystalline fluoropolymer in forming the outer clad section, it becomes possible to form the POF with excellent solvent-resistance. An example of the crystalline fluoropolymer is PVDF which is used in this embodiment. Other than PVDF, it is also possible to use polytetrafluoroethylene (PTFE). Moreover, it is also possible to use copolymer of the fluorine resin, for instance, PVDF-based copolymer, tetrafluoroethylene-perfluoro alkylvinyl ether (PFA) random copolymer, chlorotrifluoroethylene (CTFE) copolymer, and so forth. Further, copolymer of methylmethacrylate (MMA) and fluoro(meth)acrylate such as trifluoroethyl methacrylate (FMA), hexafluoro isopropyl methacrylate, or the like. Note that the molecular structure of the polymer used for the outer clad section forming material contains not less than 4% of the defect bonds with respect to the total number of the bonds of $CF_2$ units and $CH_2$ units.

Examples of the inner clad section forming material and the core forming material are (meth)acrylates [(a) (meth)acrylate without fluorine, (b) (meta)acrylate containing fluorine], (c) styrene type compounds, (d) vinyl esters, (e) fluorine polymer including cyclic structures in main chain, such as a polylmerized product of bisphenol-A which is a raw material of polycarbonate, norbornene resin, and the like. In addition, homopolymer composed of one of these monomers, copolymer composed of at least two kinds of these monomers, or a mixture of the homopolymer(s) and/or the copolymer(s) can be used. When the mixture of polymers is used, a boiling point Tb thereof is defined as the lowest boiling point of the plural raw material compounds which makeup the mixture, or a reduced boiling point if the boiling point is reduced by making an azeotropic mixture. In addition, when the copolymer or the blend polymer is obtained from the mixture, the glass transition temperature of the copolymer or the blend polymer is defined as Tg. The mixture containing (meth)acrylate or fluorine-containing polymer is preferably used for forming the light transmission medium.

Examples of the (a) (meth)acrylate without fluorine are methyl methacrylate; ethyl methacrylate; isopropyl methacrylate; tert-butyl methacrylate; benzyl methacrylate; phenyl methacrylate; cyclohexyl methacrylate, diphenylmethyl methacrylate; tricycle [5.2.1.0$^{2.6}$]decanyl methacrylate; adamanthyl methacrylate; isobornyl methacrylate; norbornyl methacrylate; methyl acrylate; ethyl acrylate; tert-butyl acrylate; phenyl acrylate, and the like.

Examples of (b) (meth)acrylate with fluorine are 2,2,2-trifluoroethyl methacrylate; 2,2,3,3-tetrafluoro propyl methacrylate; 2,2,3,3,3-pentafluoro propyl methacrylate; 1-trifluoromethyl-2,2,2-trifluoroethyl methacrylate; 2,2,3,3,4,4,5,5-octafluoropenthyl methacrylate; 2,2,3,3,4,4,-hexafluorobutylmethacrylate, and the like.

Further, examples of (c) styrene type compounds are styrene, a-methylstyrene, chlorostyrene, bromostyrene, and the like. Examples of (d) vinylesters are vinylacetate, vinylbenzoate, vinylphenylacetate, vinylchloroacetate, and the like. Examples of (e) polymers having cyclic structure(s) in the main chain are polymers obtained by polymerization of monomers having cyclic structure(s), polymers in which cyclic structures are formed in the amorphous main chain by cyclopolymerization, or the like. For instance, polyperfluorobutanilvinylether, polymer having alicycles or heterocycles in main chain disclosed in Japanese Patent Laid-Open Publication No. 8-334634, polymers disclosed in Japanese Patent Laid-Open Publication No. 2002-71972 and No. 2004-186199, and the like are preferable in terms of transmission properties. The present invention is not limited to the above polymerizable compounds. It is preferable that the kinds and relative proportions of the polymerizable compounds are selected such that the homopolymer or the copolymer formed of the polymerizable compounds has a desired refractive index profile in the light transmission medium formed therefrom.

The polymer which makes the refractive index of the outer clad section lower than that of the inner clad section is used for the outer clad section forming material. It is preferable to select the clad section forming material, especially, the outer clad section forming material with a low water absorption rate to protect the core from moisture as much as possible. The outer clad may be formed from the polymer having the saturated water absorption (water absorption) of less than 1.8%. More preferably, the water absorption of the polymer is less than 1.5%, and most preferably less than 1.0%. The water absorption (%) is obtained by measuring the water absorption after soaking the sample polymer in the water of 23° C. for one week, pursuant to the ASTM D 570 experiment.

When the polymer constituting the preform includes hydrogen atom (H), it is preferable to substitute deuterium atom (D) for the hydrogen atom. By virtue of this, transmission loss, more specifically, the transmission loss in wavelengths of a near-infrared region may be reduced.

In order to use the POF 16 for the near-infrared rays, polymers such as described in Japanese Patent No. 3332922 and Japanese Patent Laid-Open Publication No. 2003-192708 are utilized. In this polymer, deuterium atom, fluorine and so forth are substituted for the hydrogen atom of a C—H bond to prevent absorption loss caused by the C—H bond. By using this kind of the polymer, it becomes possible to reduce the loss of the transmission signal light by shifting the wavelength region causing the transmission loss to the longer-wavelength. Examples of such polymers are, for instance, deuteriated PMMA (PMMA-d8), polytrifluoroethyl methacrylate (P3FMA), and polyhexafluoro isopropyl-2-fluoroacrylate (HFIP 2-FA). It is desirable that the impurities and foreign materials in the raw compound causing diffusion are sufficiently removed before polymerization so as to keep the transparency of the POF after polymerization.

To draw the preform 15 in an excellent condition, weight-average molecular weight of the polymer for forming the preform 15 is preferably from ten thousands to one million. More preferably, the weight-average molecular weight is from thirty thousands to a half of one million. Drawing properties concern molecular weight distribution (MWD: weight-average molecular weight/number average molecular weight) as well. In a case that the MWD is too large, the drawing properties deteriorate when a constituent having extremely large molecular weight is mixed. As a result, it may become impossible to perform drawing. MWD is preferably four or less, and the more preferably three or less.

In the case the polymerizable compound is polymerized to produce a polymer, polymerization initiators can be used. For instance, there are various polymerization initiators which generate radicals, e.g. benzoil peroxide (BPO), and peroxide compound [such as tert-butylperoxy-2-ethylhexanate (PBO), di-tert-butylperoxide (PBD), tert-butylperoxyisopropylcarbonate (PBI), n-butyl-4,4-bis(tert-butylperoxy)valarate (PHV), and the like]. Other examples of the polymerization initiators are azo compounds, such as 2,2'-azobisisobutyrylonitril, 2,2'-azobis(2-methylbutylonitril), 1,1'-azobis(cyclohexane-1-carbonitryl), 2,2'-azobis(2-methylpropane), 2,2'-azobis(2-methylbutane) 2,2'-azobis(2-methylpentane), 2,2'-azobis(2,3-dimethylbutane), 2,2'-azobis(2-methylhexane), 2,2'-azobis(2,4-dimethylpentane), 2,2'-azobis (2,3,3-trimethylbutane), 2,2'-azobis(2,4,4-trimethylpentane), 3,3'-azobis (3-methylpentane), 3,3'-azobis(3-methylhexane), 3,3'-azobis (3,4-dimethypentane), 3,3'-azobis(3-ethylpentane), dimethyl-2,2'-azobis(2-methylpropionate), diethyl-2,2'-azobis(2-methylpropionate), di-tert-butyl-2,2'-azobis(2-methylpropionate), and the like. Note that the polymerization initiators are not limited to the above substances. It is also possible to combine more than one kind of the polymerization initiators.

In order to keep the physical properties, such as mechanical properties, thermal properties and so forth of the polymer uniform over the whole plastic optical fiber to be manufactured, it is preferable to control the polymerization degree by use of the chain transfer agent. The kind and the amount of the chain transfer agent are selected in accordance with the kinds of the polymerizable monomer. The chain transfer coefficient of the chain transfer agent with respect to the monomer is described, for example, in "Polymer Handbook, 3$^{rd}$ edition", (edited by J. BRANDRUP & E. H. IMMERGUT, published by JOHN WILEY&SON). In addition, the chain transfer coefficient may be calculated through the experiments in the method described in "Experiment Method of Polymers" (edited by Takayuki Ohtsu and Masayoshi Kinoshita, published by Kagaku-Dojin Publishing Company, Inc., 1972).

Preferable examples of the chain transfer agent are alkylmercaptans, for instance, n-butylmercaptan, n-pentylmercaptan, n-octylmercaptan, n-laurylmercaptan, tert-dodecylmercaptan, and the like, and thiophenols, for example, thiophenol, m-bromothiophenol, p-bromothiophenol, m-toluenethiol, p-toluenethiol, and the like. It is especially preferable to use n-octylmercaptan, n-laurylmercaptan, and tert-dodecylmercaptan in the alkylmercaptans. Further, the hydrogen atom on C—H bond may be substituted by the fluorine atom (F) or a deuterium atom (D) in the chain transfer agent. Note that the chain transfer agents are not limited to the above substances. It is also possible to combine more than one kind of chain transfer agents.

The dopant is a compound that has different refractive index from, the polymerizable compounds to be combined. The difference in the refractive indices between the dopant and the polymerizable monomer is preferably 0.005 or larger. The dopant has the feature to increase the refractive index of the polymer, compared to one that does not include the dopant. In comparison to the polymers produced from the monomers as described in Japanese Patent Publication No. 3332922 and Japanese Patent Laid-Open Publication No. 5-173026, the dopant has the feature that the difference in solution parameter is 7 $(cal/cm^3)^{1/2}$ or smaller, and the difference in the refractive index is 0.001 or larger. Any materials having such features may be used as the dopant if such material can stably exist with the polymers, and the material is stable under the polymerizing condition (such as heat and pressure conditions) of the polymerizable monomers as described above.

The dopant may be polymerizable compound, and in that case, it is preferable that the copolymer having the dopant as the copolymerized component increases the refractive index in comparison to the polymer without the dopant. Any materials having such features may be used as the dopant if such material can change the refractive index and stably exists with the polymers, and the material is stable under the polymerizing condition (such as temperature and pressure conditions) of the polymerizable compound which is the core monomer or the raw material of the inner clad. This embodiment shows the method to form refractive index profile in the core by mixing the dopant with the polymerizable compound for the core, by controlling the direction of polymerization according to the interface gel polymerizing method, and by providing gradation in concentration of the refractive index control agent as the dopant during the process to form the core. In addition, there are other methods, one example is a method in which the refractive index control agent is diffused in the previously-formed preform. Hereinafter, the core having the refractive index profile will be referred to as "graded index core". Such graded index core realizes the graded index type plastic optical member having wide range of transmission band.

Examples of the dopants are benzyl benzoate (BEN); diphenyl sulfide (DPS); triphenyl phosphate (TPP); benzyl n-butyl phthalate (BBP); diphenyl phthalate (DPP); diphenyl (DB); diphenylmethane (DPM); tricresyl phosphate (TCP); diphenylsulfoxide (DPSO). Among them, BEN, DPS, TPP and DPSO are preferable. In addition, the dopant may be the polymerizable compound such as tribromo phenylmethacrylate. In this case, although it would be difficult to control various properties (especially optical property) because of copolymerization of the polymerizable monomer and the polymerizable dopant for forming a matrix, the produced dopant may be advantageous in heat resistance. It is possible to alter the refractive index of the POF 16 to a desired value by controlling the concentration and the distribution of the dopant in the core section 14.

With respect to adding quantity of the polymerization initiator, the chain transfer agent, and the dopant, it is possible to properly determine a preferable range in accordance with the kind and so forth of the core monomer. In this embodiment, the polymerization initiator is added so as to be 0.005 to 0.150 mass % relative to the core monomer. It is much preferable to set this additive rate within a range of 0.010 mass % to 0.100 mass %. Meanwhile, the chain transfer agent is added so as to be 0.10 to 0.40 mass % relative to the core monomer. It is more preferable to set this additive rate within a range of 0.15 mass % to 0.30 mass %. In addition, when the dopant is added, its additive rate is preferably set in a range of 1 mass % to 50 mass % relative to the core monomer.

Other additives may be contained in the core and the clad so far as the transmittance properties do not decrease. For example, the additives may be used for increasing weather resistance and durability. Further, induced emissive functional compounds may be added for amplifying the optical signal. When such compounds are added to the monomer, attenuated signal light is amplified by excitation light so that the transmission distance increases. Therefore, the optical member with such additive may be used as an optical fiber amplifier in an optical transmission link. These additives may be contained in the core, the clad and a part thereof by polymerizing the additives with the various polymerizable compounds being used as the raw material.

One of production methods for the preform of the GI POF is described in Japanese Patent No. 3332922. In this method, a cylindrical resin pipe to be a clad is formed, a resin compound to be a core is poured into the hollow portion of the cylindrical pipe, and then the interfacial gel polymerization, which is one of the bulk polymerization, is performed to form the core. Polymerization conditions, in this case, the polymerization temperature and the polymerization time can be properly selected according to monomers and polymerization initiators used. In addition, there are polymerization conditions described in WO 03/19252, to form a core with no concentration fluctuation. The core may be formed by another known method, in which plural kinds of polymerizable compounds are sequentially applied to form layers having different refractive indices. Examples of the resin compound which forms the core are a resin compound having single refractive index in which a refractive index control agent is applied, a mixture of plural resins having different refractive indices, copolymer(s) and so forth. The present invention can be applied to various types of the POFs having various refractive index profiles such as step index (SI) POFs and multi step index (MSI) POFs in addition to the GI POFs.

The POF is normally coated with at least one protective layer, for the purpose of improving flexibility and weather resistance, preventing decrease in property by moisture absorption, improving tensile strength, providing resistance to stamping, proving resistance to flame, protecting from damage by chemical agents, noise prevention from external light, increasing the value by coloring, and the like to enhance the marketability of the POF 16.

Examples of the material for the protective layer are as follows. These are effective in providing mechanical property (such as bending property) due to high elasticity. There are rubbers as the polymer, such as isoprene rubbers (for example, natural rubber and isoprene rubber), butadiene rubbers (for example, styrene-butadiene copolymer rubber and butadiene rubber), diene special rubbers (for example, nitrile rubber and chloroprene rubber), olefin rubbers (for example, ethylene-propylene rubber, acrylic rubber, butyl rubber and halide butyl rubber), ether rubbers, polysulfide rubbers and urethane rubbers.

The material for the protective layer may be a liquid rubber that exhibits fluidity in a room temperature and becomes solidified by application of heat. Examples of the liquid rubber are polydiene rubbers (basic structure is polyisoprene, polybutadiene, butadiene-acrylonitril copolymer, polychloroprene, and so forth), polyorefin rubbers (basic structure is polyorefin, polyisobutylene, and so forth), polyether rubbers (basic structure is poly(oxypropylene), and so forth), polysulfide rubbers (basic structure is poly(oxyalkylene disufide), and so forth) and polysiloxane rubbers (basic structure is poly(dimethyl siloxane), and so forth).

In addition, thermoplastic elastomer (TPE) can be used for the material of the protective layer. The TPE exhibits rubber elasticity at a room temperature, and becomes plasticized at a high temperature, which facilitates the molding. Examples of the TPE are styrene TPE, olefin TPE, vinyl chloride TPE, urethane TPE, ester TPE, amide TPE, and so forth. Other materials than those described above can be used as long as the coating layer is formed at a temperature of equal to or less than the glass transition temperature Tg (° C.) of the POF polymer. For example, it is possible to use copolymer and mixed polymer of the above described materials or other materials.

A substance obtained by thermal hardening of the mixed liquid of a polymer precursors and reaction agent is also preferably used for the material of the protective layer. An example of such material is one-component thermosetting urethane composition produced from NCO block prepolymer and powder-coated amine, as described in Japanese Patent Laid-Open Publication No. 10-158353. Another example is one-component thermosetting urethane composition that is composed of urethane pre-polymer with NCO group, described in WO 95/26374, and solid amine having the size of 20 μm or smaller. For the purpose of improving the properties of the primary protective layer, additives and fillers may be added. Examples of the additives are flame retardant, antioxidant, radical trapping agent, and lubricant. The fillers may be made from organic and/or inorganic compound.

The POF may have a second (or more) protective layer around the above described protective layer as the first protective layer. If the first protective layer has a sufficient thickness to decrease the thermal damage to the POF, the requirement of the hardening temperature of the second protective layer becomes less strict compared with the first protective layer. The second protective layer may be provided with the additives such as flame retardants, UV absorbent, antioxidant, radical trapping agent, and lubricant. The flame retardants are a resin and an additive with halogen like bromine or with phosphorus. Metal hydroxide is preferably used as the flame retardant for the purpose of reducing toxic gas emission. The metal hydroxide contains water of crystallization, which cannot be removed during the manufacture of the POF. Thus, it is preferable to provide a moisture proof coat around the first protective layer and then to form the metal hydroxide as the flame retardant around the moisture proof coat.

The POF may be coated with plural coat layers with multiple functions. Examples of such coat layers are the flame retardant layer described above, a barrier layer to prevent moisture absorption, moisture absorbent (moisture absorption tape or gel, for instance) between the protective layers or in the protective layer, a flexible material layer and a foaming layer as shock absorbers to relax stress in bending the POF, a reinforced layer to increase rigidity, and the like. The thermoplastic resin as the coat layer may contain structural materials to increase the strength of the optical fiber cable. The structural materials are a tensile strength fiber with high elasticity and/or a metal wire with high rigidity. Examples of the tensile strength fibers are an aramid fiber, a polyester fiber, a polyamide fiber. Examples of the metal wires are stainless wire, a zinc alloy wire, a copper wire. The structural materials are not limited to those listed above. It is also possible to provide other materials such as a metal pipe for protection, and a support wire to hold the optical fiber cable. A mechanism to increase working efficiency in wiring the optical fiber cable is also applicable.

Next, the production method of the preform 15 is described in detail. Note that this embodiment is an example of the present invention and does not limit the scope of the present invention.

Figure 5:
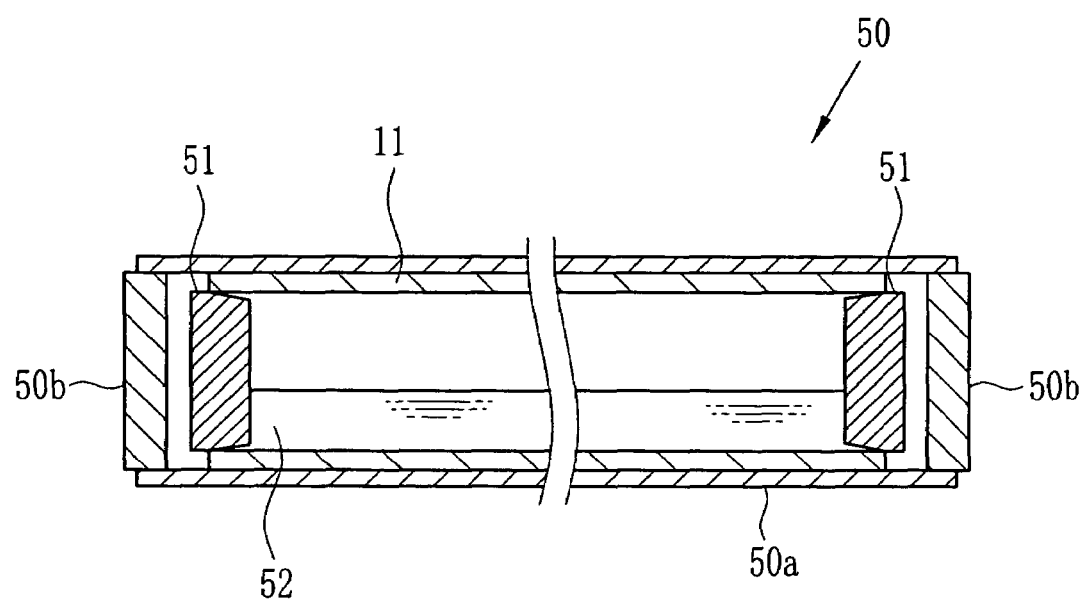
FIG. 5 is a cross-section of an example of a polymerization container.

In FIG. 5, a polymerization container 50 has a main body 50a and a pair of lids 50b. In this embodiment, the polymerization container 50, the main body 50a, and the lids 50b are made of stainless steel. As shown in FIG. 5, it is preferable that the inner diameter of the polymerization container 50 is slightly larger than the outer diameter of the outer clad section 11. The polymerization container 50 is configured such that the outer clad section 11 rotates in accordance with the rotation of the polymerization container 50, which will be described later. It is preferable to provide support members for supporting the outer clad section 11 inside the polymerization container 50 so as to support the outer clad section 11 to follow the rotation of the polymerization container. The cylindrical outer clad section 11 is previously accommodated in the polymerization container 50. The cylindrical outer clad section 11 is formed by melt-extrusion of PVDF having the molecular structure in which the number of the defect bonds constitutes not less than 4% with respect to the total number of the bonds of $CF_2$ units and $CH_2$ units.

First, a side end of the outer clad section 11 is sealed by a plug 51. Thereafter, an inner clad section forming material 52 is poured into the outer clad section 11. Then, the other side end into which the inner clad section forming material 52 is poured is also sealed by the plug 51. Thereafter, the polymerization container 50 is set in a rotation polymerization device 60 shown in FIG. 6 to perform thermal polymerization. The plug is formed of a material which is not soluble to the core section forming material, and does not contain compounds which dissolve the plasticizers. For instance, Polytetrafluoroethylene (PTFE) can be used. Note that it is also possible to perform decompression processing to the outer clad section 11 and/or to the poured inner clad section forming material 52 as necessary before or after the inner clad section forming material 52 is poured. Thereby, foam in the outer clad section 11 and the inner clad section forming material 52 is prevented.

Figure 6:
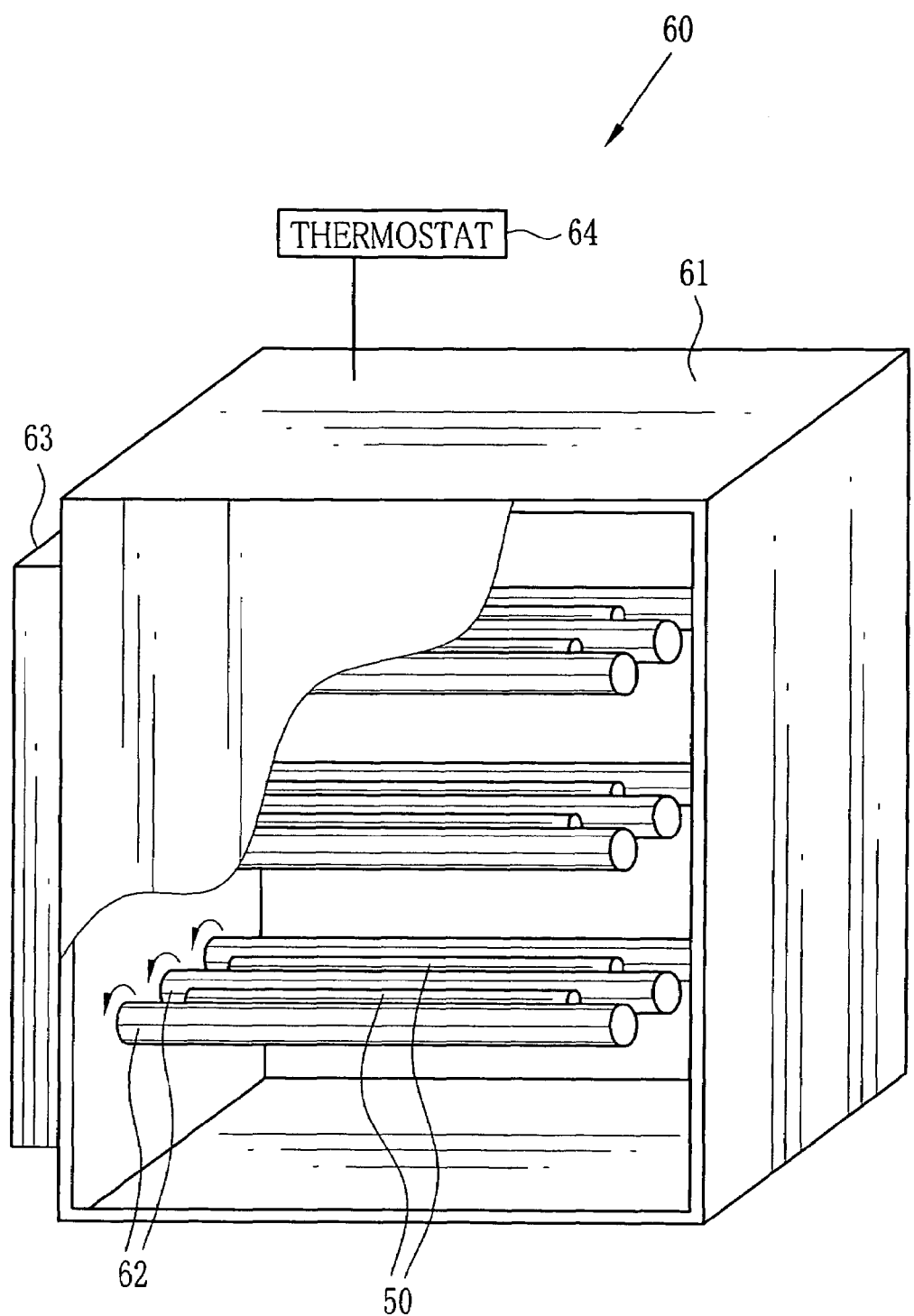
FIG. 6 is a schematic view of an example of a rotation polymerization device.

In FIG. 6, the rotation polylmerization device 60 has plural rotation support members 62, a driving section 63, and a thermostat 64 in a housing 61. The support members 62 are columnar and are approximately horizontally installed and approximately parallel to each other in the lengthwise direction such that at least one polymerization container 50 is supported by circumferential surfaces of adjacent rotation support members 62. One end of each of the rotation support members 62 is rotatably attached to a side wall of the housing 61. Each of the rotation support members 62 is independently rotated by the driving section 63. The driving section 63 is provided with a motor, a decompression device, a controller, and the like (not shown). The driving section 63 is activated and controlled by the controller. The thermostat 64 constantly measures the temperature inside the housing 61 and controls the inside temperature according to the measurement.

Figure 7:
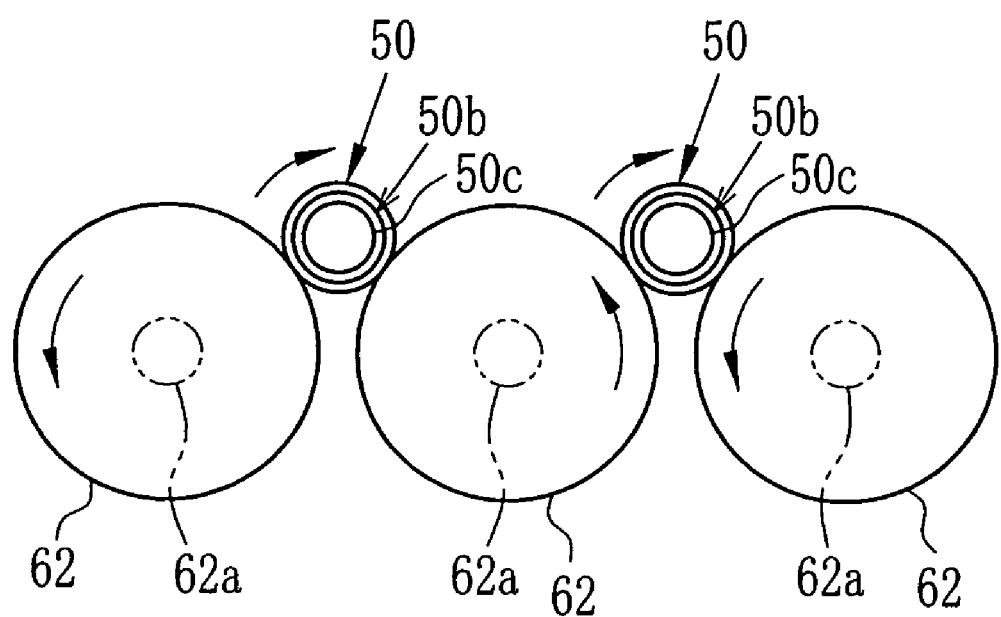
FIG. 7 is an explanatory view of a rotation method of the rotation polymerization device.

As shown in FIG. 7, during the polymerization, each polymerization container 50 is held by two adjacent rotation support members 62. The polymerization container 50 is rotated in accordance with the rotation of the rotation support member 62 controlled by the driving section 63. In this embodiment, the polymerization container 50 is rotated by a surface-drive method. However, the rotation method is not particularly limited. Note that the rotation speed of the rotation support members 62 is preferably in a range of 500 rpm and 4000 rpm, more preferably, in a range of 1500 rpm and 3500 rpm. The rotation speed is preferably adjusted within these ranges on the basis of the polymerization conditions.

As shown in FIG. 7, a magnet 50c is attached to each of the lids 50b sealing the side ends of the polymerization container 50. A magnet 62a is also attached inside each of the rotation support members 62. These magnets 62a prevent a lift of the polymerization container 50 from the rotation support members 62 during the rotation. Other than the above method, it is also possible to place a rotation member similar to the rotation support member 62 touching the upper surface of the polymerization container 50 set in the appropriate position in the rotation polymerization device 60, and rotate this rotation support member in the same direction as the rotation support members 62. It is also possible to prevent the lift by providing a holding device above the polymerization container 50, pressing against the polymerization container 50.

After pouring the inner clad section forming material 52 into the hollow portion of the outer clad section 11, the polymerization container 50 is set in the rotation polymerization device 60 with its lengthwise direction approximately horizontal, and rotated about its axis by a desired number of times while being heated. Thereby, the polymerization of the inner clad section forming material 52 is promoted.

The core section forming material is poured into the hollow portion of the inner clad section 12 in the polymerization container 50. Thereafter, the polymerization container 50 is set in the rotation polymerization device 60 in the same manner as above. At the time of this polymerization, the inner wall of the inner clad section 12 is swelled or dissolved by the contact of the core section forming material so that a swelled layer in gel form is formed in an initial stage of the polymerization. The swelled layer in gel form accelerates the polymerization speed (that is, a gel effect) to promote the reaction at the interface of the inner clad section 12 and the core section forming material, which is referred as interfacial gel polymerization. As a result, the interfacial gel polymerization initiates from the inner wall of the inner clad section 12 and proceeds toward the center of the core section 14 in the diameter direction. At this time, the smaller the molecular volume of the compound, the faster it is embedded inside the swelled liquid. As a result, the dopant with the larger molecular volume compared to other compounds is pushed from the swelled liquid toward the center of the core section 14 as the polymerization proceeds to form the core section having the refractive index profile in which the refractive index increases toward the center thereof. Thus, the preform 15 having the structure shown in FIG. 3A is fabricated.

Before the thermal polymerization for forming the inner clad section 12, a pre-polymerization can be performed with the outer clad section 11 set in an upright position. To perform the pre-polymerization, it is also possible to rotate the outer clad section 11 around its cylindrical axis by using a rotation mechanism. Thereby, the mixed section 22 can be easily formed over the inner side of the outer clad section 11. In this embodiment, the mixed layer 22 and the inner clad section 11, and the core section 14 are uniformly formed over the inner wall of the outer clad section 11 by keeping the outer clad section 11 approximately horizontal in the lengthwise direction when rotated. A degree of parallelism with the horizontal direction is not particularly limited. However, it is especially preferable when an angle of the rotation axis is approximately 5° or less with respect to the horizontal direction.

In this embodiment, at the time of the polymerization of the inner clad forming material 52, the outer clad section 11 and the inner clad section forming material 52 may be mixed to form the mixed section. This reaction is bulk polymerization. In the bulk polymerization, the polymerization in each section is promoted while the generation of foam is prevented. As a result, each section can be formed without reducing the optical properties. To form the core section 14 inside the inner clad section 12, a reaction similar to the reaction for forming the inner clad section 12, that is, an interfacial gel polymerization is occurred in a portion between the core section 14 and the inner clad section 12. As a result, it becomes possible to prevent foam in the core section 14 so that the core section 14 exhibits excellent optical properties such as low transmission losses. In the core section forming process 24, the polymerization temperature is preferably set in a range of 60° C. and 120° C., and the rotation speed of the polymerization container 50 during the rotation gel polymerization is preferably in a range of 500 rpm and 3000 rpm. Note that the polymerization temperature and the rotation speed can be selected to satisfy the above range in accordance with the type of the core section forming material and the like.

The POF produced according to the present invention is suitable for a plastic optical cable. The POF cable is selectively used according to applications. For instance, a cable assembly in which the POFs are concentrically arranged, a tape core wire in which the POF cables are linearly aligned, a cable assembly in which the tape core wires are bundled by using a band or LAP sheath, or the like can be used. When an optical device containing the POF according to the present invention is used, it is preferable to securely fix the terminal of the optical device by using an optical connector. The optical connectors widely available on the market are PN type, SMA type, SMI type, F05 type, MU type, FC type, SC type and the like.

The POF of the present invention can be used with various kinds of light emitting elements. Preferable one is Vertical Cavity Surface-Emitting Laser (VCSEL) described in Japanese Patent Laid-Open Publications No. 7-307525, No. 10-242558, No. 2003-152284, which has a narrow divergence angle and a high accumulation ratio, is actuated by relatively low-current, and can change a laser emission wavelength according to an elemental ratio. In addition, the present invention can be applied to a system to transmit optical signals, which uses optical signal processing devices including optical components, such as a light receiving element, an optical switch, an optical isolator, an optical integrated circuit, an optical transmitter and receiver module, and the like. Any known techniques can be applied to such system. The techniques are described in, for example, "'Basic and Practice of Plastic Optical Fiber' (published by NTS Inc.)", "'Optical members can be Loaded on Printed Wiring Assembly, at Last' in Nikkei Electronics, vol. Dec. 3, 2001", pp. 110-127", and so on. By combining the optical member having the POF of the present invention with the techniques in the above publications, the optical member is applicable to short-distance optical transmission system that is suitable for high-speed and large capacity data communication and for control under no influence of electromagnetic wave. In particular, the optical member is applicable to wiring in apparatuses (such as computers and several digital apparatuses), wiring in trains and containers, optical linking between an optical terminal and a digital device and between digital devices, indoor optical LAN in houses, collective housings, factories, offices, hospitals, schools, and outdoor optical LAN.

Further, other techniques to be combined with the optical transmission system are disclosed, for example, in "'High-Uniformity Star Coupler Using Diffused Light Transmission' in IEICE TRANS. ELECTRON., VOL. E84-C, No. 3, March 2001, pp. 339-344", "'Interconnection in Technique of Optical Sheet Bath' in Journal of Japan Institute of Electronics Packaging., Vol. 3, No. 6, 2000, pp. 476-480". Moreover, there are an arrangement of light emitting elements on a waveguide surface (disclosed in Japanese Patent Laid-Open Publication No. 2003-152284), an optical bus (disclosed in Japanese Patent Laid-Open Publications No. 10-123350, No. 2002-90571, No. 2001-290055 and the like); an optical branching/coupling device (disclosed in Japanese Patent Laid-Open Publications No. 2001-74971, No. 2000-329962, No. 2001-74966, No. 2001-74968, No. 2001-318263, No. 2001-311840 and the like); an optical star coupler (disclosed in Japanese Patent Laid-Open Publications No. 2000-241655); an optical signal transmission device and an optical data bus system (disclosed in Japanese Patent Laid-Open Publications No. 2002-62457, No. 2002-101044, No. 2001-305395 and the like); a processing device of optical signal (disclosed in Japanese Patent Laid-Open Publications No. 2000-23011 and the like); a cross connect system for optical signals (disclosed in Japanese Patent Laid-Open Publications No. 2001-86537 and the like); a light transmitting system (disclosed in Japanese Patent Laid-Open Publications No. 2002-26815 and the like); multi-function system (disclosed in Japanese Patent Laid-Open Publications No. 2001-339554, No. 2001-339555 and the like); and various kinds of optical waveguides, optical branching, optical couplers, optical multiplexers, optical demultiplexers and the like. When the optical system having the optical member according to the present invention is combined with these techniques, it is possible to construct an advanced optical transmission system to send/receive multiplexed optical signals. The optical member according to the present invention is also applicable to other purposes, such as for lighting (light transmission), energy transmission, illumination, and sensors.

Hereinafter an Example and a Comparative example of the present invention are described in detail. Note that the Example and Comparative example do not limit the scope of the present invention. Common production conditions such as those of the preform 15 are only described in the Example in detail. In the Comparative example, only the conditions different from the Example will be described.

EXAMPLE

In the Example (in Experiments 1-1 to 1-3), three types of POFs 15 having different outer diameters are produced from the preforms 15 by changing conditions of heat-drawing. The preforms 15 were formed by the method described below. All of the produced POFs 15 were GI POFs.

Experiment 1-1

By the melt-extrusion molding, the cylindrical outer clad section 11 was formed of PVDF having the molecular structure in which the number of the defect bonds of the successive $CF_2$ units and successive $CH_2$ units constitutes 4.5% with respect to the total number of the bonds of the $CF_2$ units and $CH_2$ units. The outer clad section 11 had the inner diameter of 20 mm, the length of 905 mm, and the outer diameter of 20.5 mm. The average roughness Ra' of the inner wall of the outer clad section 11 was 0.23 μm. A surface roughness meter (product name: VK-8500, produced by Keyence Corporation) was used for measuring the average roughness Ra'.

The inner clad section forming material was poured into the hollow portion of the outer clad section 11. The inner clad section forming material was 185 g of MMA in which the polymerization initiator and the chain transfer agents were mixed. The polymerization initiator was dimethyl-2,2'-azobis (2-methylpropionate) (product name: V-601, produced by Wako Pure Chemical Industries, Ltd.) of 0.022 mol % (a half-life at 70° C.: 5 hours). The chain transfer agent was n-laurylmercaptan of 0.1 mol %. The outer clad section 11 in which the inner clad section forming material 52 were poured was accommodated in the polymerization container 50. The polymerization container 50 was set in the rotation polymerization device 60 such that the lengthwise direction of the polymerization container 50 became horizontal. The thermal polymerization was performed for 8 hours in an atmosphere of 70° C. while the polymerization container 50 was rotated at 2000 rpm. Then, the thermal polymerization was continued for 4 hours at 90° C. with the same rotation speed. Thereby, the inner clad section 12 was formed on the inner wall of the outer clad section 11.

The core section forming material was poured in the hollow portion of the inner clad section 12 at room temperature and atmospheric pressure. The core section forming material was MMA of 80 g in which the polymerization initiator, the chain transfer agent, and the dopant were mixed. The polymerization initiator was dimethyl-2,2'-azobis(2-methylpropionate) (V-601). The chain transfer agent was n-laurylmercaptan. The dopant was diphenyl sulfide (DPS). Additive ratios of Dimethyl-2,2'-azobis (2-methylpropionate), n-laurylmercaptan, and DPS were 0.04 mol %, 0.15 mol %, and 7 mass % relative to MMA respectively. Next, the clad section 23 was set in the rotation polymerization device 60 such that the lengthwise direction of the clad section 23 became horizontal. The clad section 23 was rotated at 2000 rpm for 10 hours in an atmosphere of 70° C. Thereafter, the interfacial gel polymerization was performed at the same rotation speed for 24 hours in an atmosphere of 120° C. Thus, the preform 15 of the GI POF 16 was fabricated. In the preform 15, the hollow portion is formed in the center in the diameter direction, and the core section 14 was formed inside the clad section 23.

The POF 16 was produced by heat-drawing the preform 15 in the furnace 30 (see FIG. 2) while the temperature inside the furnace 30 was controlled at 230° C. The furnace 30 was of a cylindrical shape with a height of 480 mm, and an inner diameter of 80 mm. The drawing speed (of the preform 15) was 15 m/minute, and a residence time of the preform 15 in the furnace 30 for heat-drawing (drawing residence time) was 7 minutes. The outer diameter of the POF 16 was 316 μm. The outer diameter of the inner clad 42 was 300 μm.

The average roughness Ra of the inner wall of the outer clad 41 in the POF 16 was 0.06 μm. In the measurement of the Ra, a sample of 1 cm is cut out from the produced POF 16. The sample is divided in two equal pieces in the lengthwise direction. The pieces are immersed in acetone for three days so that the inner clad 42 and the core 44 are removed. Then, the surface roughness of the sample was measured by the surface roughness meter (VK-8500). The measuring methods used for measuring the average roughness Ra' of the inner wall of the outer clad section 11 and the average roughness Ra of the inner wall of the outer clad 41 apply to all the experiments in the Example and the Comparative example.

The bending loss of the produced POF 16 was extremely low (0.002 dB). The bending loss was measured in conformance with JIS C6861. The bending loss was a difference between a transmission loss value after bending and that before bending when the POF 16 of 5 m was bent 360° with a bending radius R of 10 mm.

Experiment 1-2

The preform 15 for producing the POF 16 was formed of the same material and by the same method as in the Experiment 1-1. The preform 15 having the outer clad section 11 with Ra' of 0.23 μm was heat-drawing in the furnace 30. The produced POF 16 had the outer diameter of 470 μm. The outer diameter of the inner clad 42 was 440 μm. Ra of the outer clad 41 of the produced POF 16 was 0.07 μm. The bending loss of the POF 16 was extremely low (0.015 dB).

Experiment 1-3

The preform 15 for producing the POF 16 was formed of the same material and by the same method as in the Experiment 1-1. The preform 15 having the outer clad section 11 with Ra' of 0.23 μm was heat-drawing in the furnace 30. The produced POF 16 had the outer diameter of 750 μm. The outer diameter of the inner clad 42 was 710 μm. Ra of the outer clad 41 of the produced POF 16 was 0.08 μm. The bending loss of the POF 16 was extremely low (0.04 dB).

Comparative Example

In the Comparative example (in experiments 2-1 to 2-3), the preforms 15 and three types of POFs 16 having different outer diameters were produced by the same method as in the Example except that the PVDF had the molecular structure in which the number of the defect bonds of the successive $CF_2$ units and successive $CH_2$ units constitutes 3.5% with respect to the total number of the bonds of the $CF_2$ units and $CH_2$ units.

Experiment 2-1

The preform having the outer clad section with Ra' of 0.28 μm was heat-drawing in the furnace 30. The produced POF 16 had the outer diameter of 316 μm. The outer diameter of the inner clad 42 was 300 μm. Ra of the outer clad 41 of the produced POF 16 was 0.14 μm. The bending loss of the POF 16 was high (0.22 dB).

Experiment 2-2

The preform having the outer clad section with Ra' of 0.28 μm was heat-drawing in the furnace 30. The produced POF had the outer diameter of 470 μm. The outer diameter of the inner clad was 440 μm. Ra of the outer clad of the produced POF was 0.15 μm. The bending loss of the POF was high (0.43 dB).

Experiment 2-3

The preform having the outer clad section with Ra' of 0.28 μm was heat-drawing in the furnace 30. The produced POF 16 had the outer diameter of 750 μm. The outer diameter of the inner clad 42 was 710 μm. Ra of the outer clad 41 of the produced POF 16 was 0.16 μm. The bending loss of the POF 16 was high (0.67 dB).

According to the results of the Example and Comparative example, regardless of the outer diameter of the POF 16, the bending loss at the interface between the outer clad and the inner clad was significantly reduced in the POF 16 when the average roughness Ra of the inner wall of the outer clad was less than 0.10 μm. The spherocrystals formed in the outer clad were extremely small under the above condition so that the light scattering and light leakage were prevented.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A plastic optical fiber produced by heat-drawing a preform, comprising:
    a cylindrical outer clad, an average roughness Ra (μm) of an inner wall of said outer clad being less than 0.10 μm;
    a cylindrical inner clad formed in a hollow portion of said outer clad; and
    a core formed in a hollow portion of said inner clad, said core being an optical transmission path,
    wherein said outer clad is formed of polyvinylidene fluoride having a molecular structure in which the number of defect bonds of successive $CF_2$ units and successive $CH_2$ units constitutes not less than 4% with respect to a total number of bonds of $CF_2$ units and $CH_2$ units.

2. A plastic optical fiber according to claim 1,
    wherein a refractive index of said core gradually decreases from a center toward outside, and is equal to or higher than that of said inner clad.

3. A production method of a plastic optical fiber comprising the steps of:
    forming a cylindrical outer clad section by melt-extrusion molding of polyvinylidene fluoride having a molecular structure in which the number of defect bonds of successive $CF_2$ units and successive $CH_2$ units constitutes not less than 4% with respect to a total number of bonds of $CF_2$ units and $CH_2$ units;
    putting a first polymerizable compound in a hollow portion of said outer clad section;
    polymerizing said first polymerizable compound to form a cylindrical inner clad section;
    filling a second polymerizable compound in a hollow portion of said inner clad section;
    polymerizing said second polymerizable compound to form a core section to fabricate a preform; and
    heat-drawing said preform to form said optical plastic fiber.

4. A production method of a plastic optical fiber according to claim 3, wherein an average roughness Ra (μm) of an inner wall of said outer clad section after said heat-drawing is less than 0.10 μm.

5. A production method of a plastic optical fiber according to claim 3, wherein said preform is heat-drawn in a range of 180° C. to 300° C.

* * * * *